Nov. 17, 1959 D. L. CURTIS 2,913,675

PULSE WIDTH MODULATOR

Filed Aug. 6, 1957 2 Sheets-Sheet 1

INVENTOR:
Daniel L. Curtis

By Seymour M. Rosenberg
Attorney

Nov. 17, 1959 D. L. CURTIS 2,913,675

PULSE WIDTH MODULATOR

Filed Aug. 6, 1957 2 Sheets-Sheet 2

INVENTOR:
Daniel L. Curtis

By Seymour M. Rosenberg
Attorney

United States Patent Office 2,913,675 Patented Nov. 17, 1959

2,913,675

PULSE WIDTH MODULATOR

Daniel L. Curtis, Manhattan Beach, Calif., assignor to Litton Industries of California, Beverly Hills, Calif.

Application August 6, 1957, Serial No. 676,654

13 Claims. (Cl. 332—9)

The present invention relates to a simplified pulse modulator and more particularly to a pulse modulator for converting a phase shifted signal to a corresponding pulse modulated signal representative of the magnitude of phase shift.

It is frequently necessary in the field of analog-to-digital conversion and in other applications to convert a phase shifted signal to a pulse modulated signal representing the phase shift of the phase shifted signal. For example, the angular position of a rotatable shaft is normally sensed as the magnitude of the phase shift, relative to a predetermined reference signal, of a signal generated by a resolver coupled to the shaft. If the sensed information is to be utilized by a digital computer, in one well known process of analog-to-digital conversion it is customary to convert the phase shifted signal to a corresponding pulse width modulated signal wherein the width of the pulse is proportional to the phase shift. The pulse width modulated signal is then utilized to gate precision frequency triggering pulses into an electronic counter so that the count registered by the counter is proportioned to the phase shift.

It is, however, to be specifically understood that the invention herein disclosed is not limited in application to pulse width modulation conversion, but can be utilized equally well in other types of pulse modulation conversion, as for example, pulse position modulation. However, for ease of description and understanding, hereinafter the discussion will be largely centered upon conversion of a phase shifted signal to a corresponding pulse width modulated signal.

Since it is often necessary to convert from a phase shifted signal to a pulse width modulated signal in the hereinbefore discussed types of computer work, a simple, accurate pulse width modulator is very much in demand.

The customary procedure followed in the prior art in mechanizing a pulse width modulator is to apply a phase shifted signal to one pulse forming circuit and to apply the corresponding reference signal to another pulse forming circuit. The output signal of one pulse forming circuit is applied to one of the two inputs of a bistable flip-flop circuit, while the output of the remaining pulse forming circuit is applied to the remaining input of the flip-flop circuit. The output of the flip-flop circuit will then be a signal composed of a plurality of sequential pulse width modulated pulses, wherein the width of each pulse will be dependent upon the phase shift of the corresponding cycle of the phase shifted signal. The pulse forming circuits may comprise any of a number of circuits well known in the art, as for example, a multiar circuit or a squaring amplifier with differentiated output.

If, for example, a multiar circuit is utilized as a pulse forming circuit, the multiar circuit can be arranged to produce a pulse whenever the applied signal makes an excursion in a chosen direction to a predetermined voltage level. For example, if the positive direction had been chosen, the multiar circuit can be arranged to produce a pulse whenever the applied signal rises to the predetermined voltage level; while on the other hand, if the negative direction had been chosen, the multiar circuit can be arranged to produce a pulse whenever the applied signal falls to the predetermined level. It should be here noted that the predetermined voltage level can be and will hereinafter be considered to be at the zero or ground level of the system.

As hereinbefore mentioned, in such a prior art mechanization the phase shifted signal is applied to one multiar circuit which is connected to a first input of the flip-flop; while the reference signal is applied to another multiar circuit, which is connected to a second input of the flip-flop. Therefore, a triggering pulse is applied to the first input of the flip-flop whenever the phase shifted signal makes an excursion to zero voltage in the chosen direction; while a triggering pulse is applied to the second input of the flip-flop whenever the reference signal makes an excursion to zero voltage in the chosen direction. The flip-flop circuit is responsive to a triggering pulse applied to its first input to generate an output signal at a first voltage level and to a triggering pulse applied to its second input to generate the output signal at a second voltage level. Therefore, the flip-flop output voltage level will change twice during each input cycle, the periods between changes depending upon the phase difference between the corresponding cycles of the phase shifted signal and the reference signal. A pulse width signal is produced thereby, wherein the width of each pulse is dependent on the phase shift of the corresponding cycle of the phase shifted signal.

If a squaring amplifier is utilized as a pulse forming circuit and the output of the amplifier is differentiated, then the series of resulting pulses can be utilized in the same manner as the pulses generated by the multiar circut, hereinbefore discussed, to generate the desired pulse width modulated signal.

A pulse width modulator of the form just discussed, however, has certain inherent deficiencies, the most disabling being the fact that any slight variation between the two pulse forming circuits will directly affect the accuracy of the pulse width signal. For example, a drift in one pulse forming circuit will change the phase relationship of the phase shifted signal with respect to the reference signal, thereby affecting the ability of the pulse width modulator to accurately convert phase shifted signals to pulse width modulated signals. Furthermore, the use of two pulse forming circuits is expensive and produces a complex circuit which is more subject to breakdown and increased repair costs.

The present invention, on the other hand, provides a pulse width modulator having only one pulse forming circuit, whereby a phase shifted signal can be converted to a pulse width (and/or pulse position) modulated signal. According to the invention, a reference signal and the phase shifted signal are applied to a selection gate circuit along with a feedback signal derived from the output of a bistable flip-flop circuit. The selection gate circuit is selectively operable under the control of the output of the flip-flop circuit for passing either the phase shifted signal or the reference signal to a single, common or shared, pulse forming circuit. In operation, the selection gate alternately passes the phase shifted signal and the reference signal to the pulse forming circuit. For example, the phase shifted signal will be passed to the pulse forming circuit until the signal makes an excursion to the reference level in the chosen direction. Then the reference signal is passed until it too makes an excursion to the reference level in the chosen direction at which time the phase shifted signal will again be passed, repeating the cycle of operation.

For ease of description and understanding, the chosen direction hereinafter shall be considered the negative direction. However, it is specifically noted that the invention is not limited to a negative direction. For example, a pulse forming circuit can be mechanized, according to the invention, wherein the chosen direction is the positive direction.

The output pulse of the pulse forming circuit is applied to a steering gate circuit concurrently with the feedback signal from the flip-flop circuit. The steering gate circuit is selectively operable under control of the feedback signal to apply the output signal of the pulse forming circuit alternately to the first and then the second input terminals of the flip-flop, so that the flip-flop will be made to change state.

The flip-flop circuit then generates a pulse width modulated signal wherein the width of each pulse is proportional to the phase difference between the corresponding cycles of the phase shifted signal and the reference signal. Since a plurality of phase shifted and reference cycles are sequentially applied to the selection gate circuit, a plurality of corresponding pulse width modulated signals are sequentially generated by the modulator, wherein the width of each pulse width signal is proportional to the phase difference between the corresponding cycles of the phase shifted signal and the reference signal.

A pulse width modulator, according to the invention, is capable of operation with only one pulse forming circuit for two reasons: Firstly, the selection gate circuit is operable for selecting, from the phase shifted signal and the reference signal, the appropriate input signal to apply to the pulse forming network; secondly, the steering gate circuit is operable to select the appropriate input terminal of the flip-flop circuit to which to apply each triggering pulse generated by the pulse forming circuit.

Since only one pulse forming circuit is necessary in the pulse width modulator of the invention, the modulator is freed from the inherent deficiencies present in the hereinbefore discussed types of prior art modulators. If drift is present in the pulse forming circuit of the invention, it will have no effect on the pulse width of the pulse width output signal since such drift will affect both the reference signal and the phase shifted signal to the same degree. Further, the pulse width modulator of the present invention will be less expensive to produce and maintain, since it will not be necessary to include two pulse forming circuits and thereby, the modulator will include fewer components which are subject to breakdown.

It is, therefore, an object of the invention to provide a converter for converting a phase shifted signal to a pulse modulated signal.

It is another object of the invention to provide a pulse modulator having only one pulse forming circuit.

It is a further object of the invention to provide, in a pulse modulator, a selection gate circuit selectively operable for alternately selecting an applied phase shifted signal and an applied reference signal for application to a single pulse forming circuit so that the two signals can time share the pulse forming circuit.

It is still another object of the invention to provide, in a pulse modulator, a steering gate circuit selectively operable for applying an output signal of a time shared pulse forming circuit to the appropriate input of a bistable element which controls the steering gate circuit.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
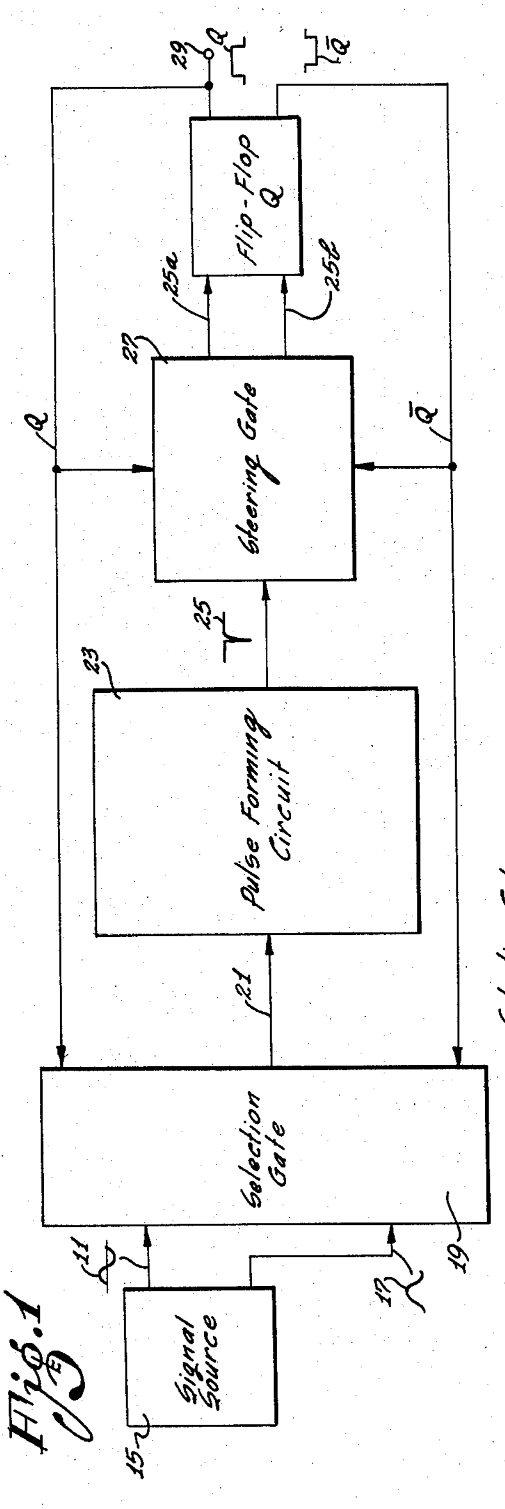
Fig. 1 is a block diagram of a pulse width modulator of the invention.

Referring now to the drawings, wherein like or corresponding parts are designated by the same reference characters throughout the several views, there is shown in Fig. 1 a pulse width modulator, according to the invention, which is operative to convert a phase shifted signal 11 to a corresponding pulse width modulated signal Q.

As shown in Fig. 1, a signal source 15 generates phase shifted signal 11 and a reference signal 17, which are applied over correspondingly designated conductors 11 and 17, respectively, to a selection gate 19, which also receives a pair of feedback signals, a signal Q and a complementary signal $\bar{Q}$, originating from a flip-flop circuit Q. (For purposes of facilitating and clarifying description, each conductor will be hereinafter similarly designated in terms of the signal applied over the conductor.) Selection gate 19 is operable under the control of feedback signals Q and $\bar{Q}$ for alternately selecting either the phase shifted signal or the reference signal and passing the selected signal to a single, common or shared, pulse forming circuit. For example, the phase shifted signal will be selected and passed to the pulse forming circuit until the signal makes an excursion to the reference level in a chosen direction. Then the reference signal is selected and passed until it too makes an excursion to the reference level in the chosen direction, at which time the phase shifted signal will again be passed, repeating the cycle.

In subsequent description the chosen direction shall be assumed to be the negative direction corresponding to a fall of the selected signal to the predetermined reference. However, the present invention is not limited to a negative direction since it will be understood that a positive direction could equally well be utilized as the chosen direction.

The signal which is selected by the selection gate will hereinafter be designated as selected signal 21 and the selected signal will be said to alternately correspond in waveform to phase shifted signal 11 and reference signal 17. The selected signal is applied over conductor 21 to a pulse forming circuit 23, which generates an actuating pulse 25, this actuating pulse being applied to a steering gate 27 over conductor 25. Steering gate 27 is selectively operable under control of feedback signals Q and $\bar{Q}$ to apply the actuating pulses alternately to an S input and a Z input of flip-flop Q.

In response to actuating pulse 25, flip-flop Q generates at an output terminal 29, a bilevel (high and low level) voltage signal Q which comprises the pulse width modulated signal, the width of each high level pulse being proportional to the phase difference between the corresponding cycles of the phase shifted signal and the reference signal. A bileveled signal $\bar{Q}$, complementary to signal Q, is also produced by the flip-flop. Since a plurality of phase shifted and reference cycles are sequentially applied to the selection gate, a plurality of corresponding pulse width modulated signals are sequentially generated by the flip-flop circuit, wherein the width of each pulse signal is proportional to the phase difference between the corresponding cycles of the phase shifted signal and the reference signal.

Signal source 15 may be any one of several well-known sources of a reference signal and a phase shifted signal, as for example, an A.C. resolver which senses the rotated position of a shaft by means of the magnitude of the phase shift of a signal which it generates.

Figure 2:
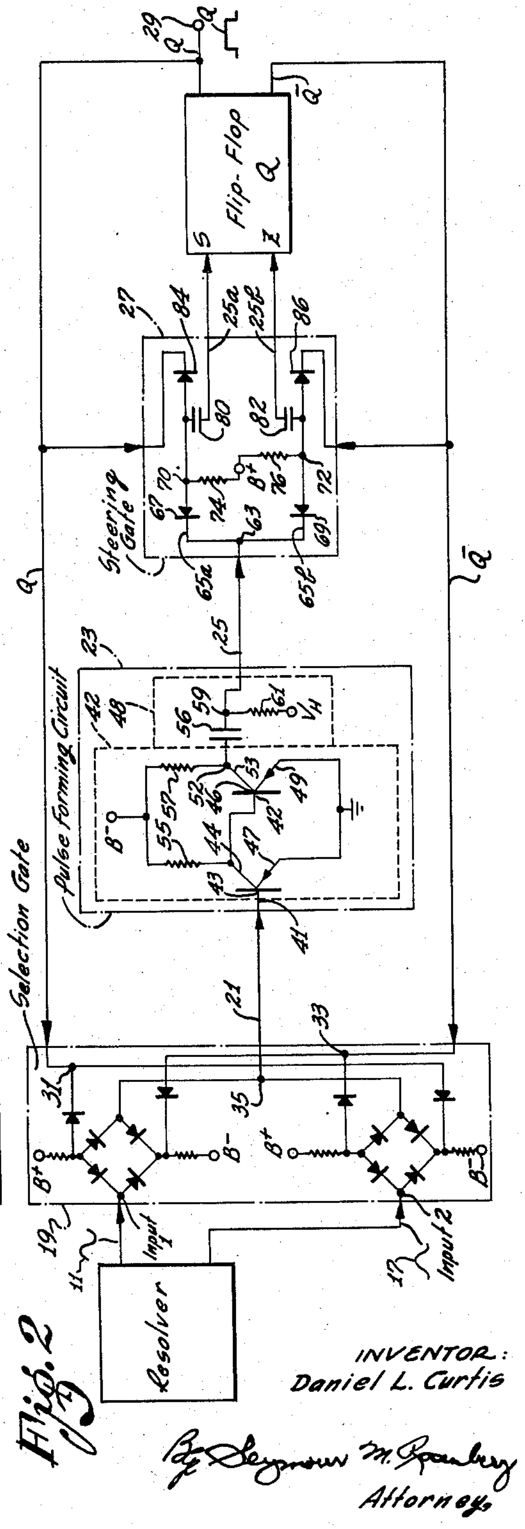
Fig. 2 is a partly block and partly circuit diagram of a pulse width modulator of the invention.

Referring now with particularity to the structure and operation of selection gate 19, as shown in Fig. 2, the selection gate is selectively operable under control of feedback signals Q and $\bar{Q}$ to present a closed circuit between input terminal 1 and an output terminal 35 and an open circuit between an input 2 and output 35 or vice versa. The selection as to which input terminal will be close circuited and which will be open circuited at any given time, will be made so that selection gate 19 will function to select and pass to output terminal 35 alternately the phase shifted signal and the reference signal, as hereinbefore described.

Selection gate 19 comprises a twin diode bridge gate for switching between two analog signals. A detailed discussion of such a gate may be found in copending U.S. patent application, Serial No. 593,230, for "Electronic Digital Multipliers," filed June 22, 1956, by Daniel L. Curtis. Phase shifted signal 11 and reference signal 17 are applied to input 1 and input 2 of selector gate 19, respectively, while feedback signals Q and $\bar{Q}$ are applied to a pair of gating terminals 31 and 33, respectively. In operation the selection gate will pass the phase shifted signal to output terminal 35 when feedback signal Q is at its high level value while the reference signal will be passed to output terminal 35 when feedback signal $\bar{Q}$ is at its high level value. As will be hereinafter discussed, feedback signal Q will be at a high level only when feedback signal $\bar{Q}$ is at a low level and vice versa, so that one of the two input signals applied to selector gate 19 will always be passed to output terminal 35, but both signals will never be concurrently passed to output terminal 35. The selected signal that is passed to output terminal 35 is as will be hereinafter demonstrated, the first of the two input signals to fall to the predetermined reference level, which as hereinbefore mentioned is assumed to be the zero voltage level.

Referring now with particularity to pulse forming circuit 23, a negative actuating pulse 25 is generated by pulse forming circuit 23 whenever the selected signal makes an excursion to the zero voltage level in the negative direction or, in other words, falls to the zero voltage level. Within pulse forming circuit 23 the selected signal is applied over conductor 21 to a squaring amplifier 42, which produces a resultant squared output signal. The squared output signal is applied to a differentiating circuit 48, which generates a negative pulse actuating signal 25, whenever the squared output signal falls to the zero voltage level.

It is specifically noted herein that if it be desired to generate a pulse position modulated signal rather than the pulse width modulated signal, the plurality of actuating pulses 25 can be utilized as a pulse position modulated signal. This is true since, as will appear hereinbelow, the relative positions of alternate actuating pulses 25 will be determined by the phase shift of phase shifted signal 11. Therefore, the present invention includes within its scope pulse position modulation.

The selected signal is applied to the squaring amplifier 42 at a base electrode 41 of a transistor 43 and through a collector electrode 44 of transistor 43 to a base electrode 42 of a transistor 46. The emitter electrodes of transistors 43 and 46, designated emitter electrodes 47 and 49, respectively, are connected to a source of ground potential. The collector electrodes, designated as collector electrodes 44 and 53, of transistors 43 and 46, respectively, are connected through resistors 55 and 57, respectively, to a source of negative potential B−. The collector electrode of transistor 46 is further connected to differentiating circuit 48, at one side of a capacitor 56, while the other side of capacitor 56 is connected to a terminal 59. A source of potential $V_H$, whose voltage is equal to the high level voltage of feedback signals Q and $\bar{Q}$, is connected through a resistor 61 to terminal 59. Terminal 59 is further connected to actuating conductor 25.

In operation the magnitude of selected signal 21 causes transistor 43, which is operated as a squaring amplifier, to become overdriven. Therefore, the selected signal will be clipped top and bottom, thereby taking the rough form of a square wave. The clipped selector signal is then applied to the base of transistor 46 which functions as another squaring amplifier. Transistor 46 amplifies the selected signal and further clips the signal top and bottom to form a more perfect wave signal at collector 53. The squared signal is then applied to differentiating circuit 48, which generates a negative pulse, whenever the squared input signal falls to the zero voltage level.

Referring to differentiating circuit 48, when the squared output signal of squaring amplifier 42 is at either a positive voltage level or a negative voltage level, capacitor 56 will be changed to the high level voltage $V_H$ by potential source $V_H$. When the squared output signal of squaring amplifier 42 changes its level from a positive voltage to a negative voltage, the charge on capacitor 56 will be momentarily pulled down producing the negative actuating pulse 25. When the squared output signal changes level, from a negative voltage level to a positive level, the charge on capacitor 56 will be momentarily pulled up producing a positive pulse. However, as will be hereinafter explained, positive pulses cannot pass through the steering gate and, therefore, will have no affect upon the operation of the present embodiment of the invention. Each negative actuating pulse produced by the pulse forming circuit is applied over actuating conductor 25 to steering gate 27, which operates to selectively pass each negative pulse to one or the other of the inputs of flip-flop Q.

Steering gate 27 is selectively operable under the control of feedback signals Q and $\bar{Q}$ to alternately apply actuating signal 25 to the S input and Z input of flip-flop Q. Actuating pulse 25 is then applied over a pair of conductors $65_a$ and $65_b$ to the cathode electrodes of a pair of diodes 67 and 69, respectively, and then from the anode electrodes of these diodes to a pair of terminals 70 and 72, respectively. Terminal 70 is connected to one side of a capacitor 80, the anode electrode of a diode 84, and through a resistor 74 to a source of potential B+. Terminal 72 is connected to one side of a capacitor 82, the anode electrode of a diode 86, and through a resistor 76 to the source of potential B+. Feedback signals Q and $\bar{Q}$ are applied to the cathodes of diodes 84 and 86, respectively, while the other sides of capacitors 80 and 82 are connected to a pair of actuating conductors $25_a$ and $25_b$, respectively.

In operation steering gate 27 will apply the actuating pulse 25 to conductor $25_a$ if feedback signal Q is at its high level and to conductor $25_b$ if feedback signal $\bar{Q}$ is at its high level. When signal Q is at its high level, terminal 70 will be at the high level voltage of signal Q, since it is at this voltage that diode 84 becomes back biased. Therefore, capacitor 80 will be charged to the signal Q high level voltage $V_H$, so that when negative actuating pulse 25 is applied to the cathode electrode of diode 67, the voltage on the capacitor will momentarily be pulled down thereby applying actuating pulse 25 to conductor $25_a$. It should be noted that when the hereinbefore referred to positive pulse from pulse forming circuit 23 is applied to the cathode of diode 67, there will be no effect felt at terminal 70 since diode 67 will be back biased. When signal Q is at its low level negative voltage terminal 70 will be at the low voltage and, therefore, it is clear that when actuating pulse 25 is applied to the cathode electrode of diode 67, the diode will be back biased and the actuating pulse will not be applied to actuating conductor $25_a$. The actuating pulse 25 will be applied or not to actuating conductor $25_b$ when feedback signal $\bar{Q}$ is at its high level or low level, respectively, in the same manner as herein just discussed and, therefore, will not be further discussed herein.

Referring now with particularity to the flip-flop circuit Q, wherein high and low voltage level signals are generated to form a pulse width modulated signal Q in response to applied actuating signal 25, flip-flop Q, as shown in Fig. 2, has a pair of inputs hereinbefore designated as the S input and Z input, respectively. Flip-flop Q produces the output signal Q having high and low voltage levels, as hereinbefore mentioned, in accordance with the state of the flip-flop and also produces the output signal $\bar{Q}$ which has opposite or complementary voltage levels.

In operation flip-flop Q is responsive to the application of an input signal to its S input terminal for being set to its "set" state and to the application of an input signal to its Z input terminal for being set to its "zero" state. When flip-flop Q is in its "set" state, signal Q will be at its high level, while complementary signal $\bar{Q}$ will be at its low level. Conversely, when flip-flop Q is at its "zero" state, signal Q will be at a low level while complementary signal $\bar{Q}$ will be at a high level. The detailed structure for one suitable form of flip-flop can be found in the March 1955 issue of "IRE Transactions on Electronic Computers," in an article entitled, "Transistor Circuitry for Digital Computers," by L. C. Wanlass at page 13.

Figures 3, 4:
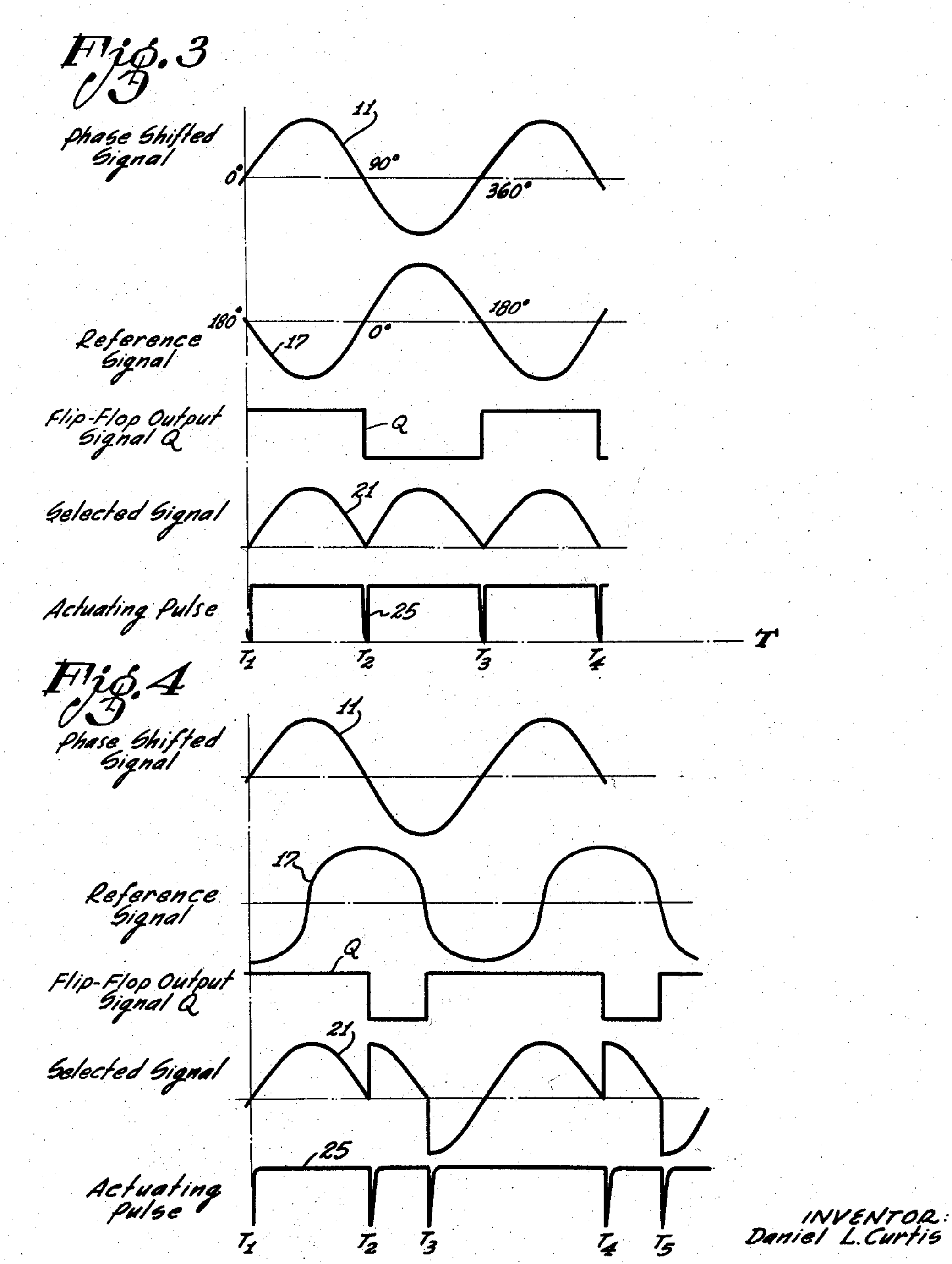
Fig. 3 is a plot of a phase shifted input signal with a 180° phase shift and a reference input signal, plotted on a common time axis with signals generated by the pulse width modulator of Fig. 2 for a 180° phase shift.
Fig. 4 is a plot of a phase shifted input signal with a 270° phase shift and a reference input signal, plotted on a common time axis with signals generated by the pulse width modulator of Fig. 2 for a 270° phase shift.

Considering now the overall operation of the pulse width modulator of the invention, there is shown in Fig. 3 as they appear in the operation, waveforms of the two input signals (the phase shifted signal 11 and the reference signal 17), the flip-flop pulse width modulated output signal Q, the selected signal 21, and the actuating pulses 25, all plotted upon a common axis. As shown in Fig. 3, the phase shift between the phase shifted signal and the reference signal is 180° and a pulse width modulated signal Q is accordingly generated wherein a high level pulse is produced during ½ of each input cycle.

As shown in Fig. 3, the selected signal is the phase shifted signal between times $T_1$ and $T_2$. At time $T_2$, the selected signal falls to zero voltage, thereby generating an actuating signal pulse which changes the state of flip-flop Q, this in turn changes signal Q from a high level to a low level. This causes the selection gate, as hereinbefore discussed, to pass the reference signal, so that the selected signal is the reference signal. At time $T_3$, the reference signal falls, thereby generating an actuating pulse which causes flip-flop Q to again change its state, causing signal Q to go to its high level, as shown in Fig. 3. The selected signal is then again the phase shifted signal, which falls to zero at time $T_4$, causing the flip-flop output signal Q to change to its low level. Since times $T_1$, $T_2$, $T_3$, and $T_4$ are all ½ an input cycle apart, a pulse width signal is generated with a high level pulse existing during ½ of each input cycle and thus representing the phase shift of 180° by a corresponding pulse width modulated signal.

Referring now to Fig. 4, there are shown the same waveforms as in Fig. 3, as they appear for a phase shift of 270° between the phase shifted signal 11 and the reference signal 17. At time $T_1$, the selected signal is the phase shifted signal. At time $T_2$, an actuating signal pulse is formed causing flip-flop Q to change states, thereby changing the signal Q to a low level signal (and also changing signal $\bar{Q}$ from a low to a high level). The selected signal then is the reference signal until time $T_3$. At this time the selected signal falls to zero so that an actuating pulse is generated which changes the state of flip-flop Q and hence the level of signals Q and $\bar{Q}$. The selected signal between times $T_3$ and $T_4$ is the phase shifted signal; and it should be noted that between times $T_3$ and $T_4$ the selected signal rises to zero or, in other words, makes an excursion to zero in the positive direction, producing a positive pulse. However, the positive pulse that is formed is isolated by steering gate 27 and, therefore, does not have any effect on the operation of the invention, as hereinbefore discussed. Because positive pulses have no effect upon the operation of the invention, they are not considered actuating pulses; therefore, they are not shown in Figs. 3 and 4. At time $T_4$, the selected signal makes an excursion in the chosen direction so that signals Q and $\bar{Q}$ change level, causing the selected signal to be the reference signal which falls to zero at time $T_5$. As shown in Fig. 4, the flip-flop output signal Q generates a pulse width signal wherein the high level pulse is ¾ of an input cycle in width, when the phase shift is 270°.

It will be understood, of course, that the pulse width modulator of the invention may be modified or altered in many particulars without departing from the invention. For example, the pulse forming circuit could be mechanized by the use of a multiar circuit rather than the squaring amplifier 42, hereinbefore discussed. It is to be further understood that the pulse width modulator of the invention is not limited to the specific uses herein disclosed. For example, the pulse width modulator of the invention can be utilized to advantage in "phase shift" navigational systems and C.W. (continuous wave) radar. Accordingly, it is to be expressly understood that the invention is to be limited only by the spirit and scope of the appended claims.

What is claimed as new is:

1. A pulse modulator for converting a phase shifted signal, whose phase is shifted with respect to a reference signal, to a pulse modulated signal having a pulse duration period which is proportional to the phase shifted signal, said modulator comprising: selection means selectively operable in response to the phase shifted signal and the reference signal in a first mode of operation to produce a selected signal corresponding in waveform to the phase shifted signal and in a second mode of operation to produce said selected signal corresponding in waveform to said reference signal; pulse forming means responsive to said selected signal to produce an actuating signal; modulator means responsive to said actuating signal to generate the pulse modulated signal.

2. The combination defined in claim 1 wherein said modulator means further includes apparatus responsive to said actuating signal for changing the mode of operation of said selection means.

3. A pulse modulator for converting a phase shifted signal, whose phase is shifted with respect to a reference signal, to a pulse modulated signal, the duration of the pulses being representative of the magnitude of the phase shift, said pulse modulator comprising: selection means operable to select either the phase shifted signal or the reference signal whichever is the first to make an excursion to a predetermined voltage level in a chosen direction; pulse forming means responsive to the selected signal to produce an actuating pulse whenever the selected signal makes an excursion to the predetermined voltage level in the chosen direction; modulator means having first and second input terminals and responsive to application of said actuating signal to said first input terminal for generating the modulated signal at a first voltage level and responsive to application of said actuating signal to said second input terminal to generate the modulated signal at a second voltage level; and steering means responsive to said actuating signal for applying said actuating signal alternately to said first and second input terminals of said modulator means.

4. A pulse modulator for converting a phase shifted signal, whose phase is shifted with respect to a reference signal, to a pulse modulated signal having a duration indicative of the phase shift of the phase shifted signal, said modulator comprising: modulator means having first and second input terminals, said modulator means being operable in response to application of a predetermined actuating signal to said first input for generating the pulse modulated signal at a first level and to application of the actuating signal to said second input for generating the pulse modulated signal at a second level; selection means selectively operable in response to the pulse modulated signal for selecting either the applied phase shifted signal or reference signal, said selection means being operable for selecting the phase shifted signal when said pulse modulated signal is at said first level and selecting the reference signal when said pulse modulated signal is at said second level; pulse forming means responsive to the selected signal to generate the predetermined actuating signal whenever the selected signal reaches a predetermined reference level; and steering means selectively operable in response to said pulse modulated signal for applying said actuating signal alternately to said first and second input terminals of said modulator means.

5. The combination defined in claim 4 wherein said steering means includes alternating means selectively operable for applying the actuating signal to said first input terminal and second input terminal in response to the modulated signal at said first level and said second level, respectively.

6. In a pulse modulator, the combination comprising: a source of a phase shifted signal and of a reference signal; modulator means responsive to the application of predetermined actuating signals for generating a modulated signal including impulses whose separation is representative of the phase shift of the phase shifted signal; feedback means coupled to said modulator means for generating a feedback signal; selection means operable in response to the feedback signal for alternately selecting the phase shifted signal and the reference signal; pulse forming means responsive to the selected signal to produce the predetermined actuating signals; and means for applying the actuating signals to said modulator means.

7. A pulse modulator for converting a phase shifted signal, whose phase is shifted with respect to a reference signal, to a pulse modulated signal including pulses whose widths are representative of the phase shift, said modulator comprising: selection means selectively operable in a first mode of operation for producing a selected signal corresponding in waveform to the phase shifted signal and operable in a second mode of operation for producing said selected signal corresponding in waveform to the reference signal; pulse forming means responsive to said selected signal to produce an actuating signal whenever said selected signal makes an excursion to a predetermined level; modulator means having first and second input terminals and responsive to the application of said actuating signal to said first input terminal to generate the modulated signal at a first level and responsive to the application of said actuating signal to said second input terminal to generate the modulated signal at a second level; and steering means selectively operable under the control of the modulated signal to apply the actuating signal alternately to said first and second input terminals.

8. The combination defined in claim 7 which further includes feedback means, coupled between said modulator means and said selection means, for transmitting a bi-level feedback signal, having first and second levels, to said selection means for rendering said selection means inoperable in said first mode of operation and operable in said second mode of operation when said feedback signal is at said first level and to render said selection means inoperable in said second mode of operation and operable in said first mode of operation when said feedback signal is at said second level.

9. A pulse width modulator for converting a phase shifted signal, whose phase is shifted with respect to a reference signal, to a pulse width modulated signal, wherein the width of each pulse is proportional to the phase shift of the corresponding cycle of the phase shifted signal, the combination comprising: a bistable element having first and second stable states of operation and responsive to application of a predetermined actuating signal to change its operational state, said bistable element generating the modulated signal at first and second levels when said bistable element is operating in said first and second stable states, respectively; feedback means coupled to said bistable element and operable to generate a feedback signal; selection means coupled to said feedback means and selectively operable under control of said feedback signal to generate a selected signal which corresponds in waveform to either the applied phase shifted signal or the applied reference signal, said selected signal corresponding in waveform to the phase shifted and reference signals when said bistable element is in said first state and second state of operation, respectively; and pulse forming means responsive to the application of said selected signal for generating the predetermined actuating signal and applying the actuating signal to said bistable element whenever said selected signal makes an excursion to a predetermined level.

10. The combination defined in claim 9 wherein said element further includes first and second input terminals responsive to the predetermined actuating signal to cause said bistable element to operate in said first or second stable states, respectively, and steering means for alternately directing the predetermined actuating signal to said first and second input terminals.

11. A pulse modulator for converting a phase shifted signal, whose phase is shifted with respect to a reference signal, to a pulse modulated signal, said modulator comprising: selection means selectively operable in response to the phase shifted signal and the reference signal in a first mode of operation to produce a selected signal corresponding in waveform to the phase shifted signal and in a second mode of operation to produce said selected signal corresponding in waveform to said reference signal, said selection means selectively operable for alternately operating in said first and second modes of operation; and modulator means operable in response to said selected signal to produce the modulated signal.

12. The combination defined in claim 11 wherein said modulator means further includes pulse forming means responsive to said selected signal for producing an actuating pulse whenever said selected signal makes an excursion to a predetermined level in a chosen direction; bistable means having a first input terminal and a second input terminal and responsive to application of said actuating pulse to said first input terminal and second input terminal to generate the modulated signal at a first level and a second level, respectively; and steering means operable in response to said actuating signal to apply said actuating signal alternately to said first and second input terminals, respectively.

13. The combination defined in claim 11 wherein said modulator means further includes pulse forming means for producing an actuating pulse in response to said selected signal to form a pulse position modulated signal, said pulse forming means being operable to produce said actuating pulse when said selected signal makes an excursion to a predetermined level in a chosen direction.

References Cited in the file of this patent

UNITED STATES PATENTS 2,774,957 Towner ---------------- Dec. 18, 1956